United States Patent [19]

Galichowski et al.

[11] Patent Number: 4,806,058
[45] Date of Patent: Feb. 21, 1989

[54] MATERIAL HANDLING DEVICE

[76] Inventors: Joseph Galichowski, Box 13, Two Hills, Alberta; John D. Shokoples, 12830 - 101 St. Ste. "B", Edmonton, Alberta, both of Canada

[21] Appl. No.: 647,152

[22] Filed: Sep. 4, 1984

[51] Int. Cl.⁴ .............................................. B65G 65/48
[52] U.S. Cl. .................................... 414/304; 414/326; 414/588
[58] Field of Search .............. 414/293, 298, 300, 301, 414/304, 325, 588, 326

[56] References Cited

U.S. PATENT DOCUMENTS

| | | | |
|---|---|---|---|
| 3,134,491 | 5/1964 | Glenn et al. | 414/310 |
| 4,146,145 | 3/1979 | Easton | 414/310 |
| 4,149,845 | 4/1979 | Merrill | 414/304 X |

Primary Examiner—Frank E. Werner
Attorney, Agent, or Firm—Ernest Peter Johnson

[57] ABSTRACT

The device is operative to discharge the triangular ridge of grain, which remains in the bottom of a cylindrical storage bin after the bulk of the bin contents has been discharged by gravity through a central outlet in the bin floor. The device comprises a vertical, rotatable, driven shaft mounted to extend upwardly from the outlet. A free-floating sweep arm is pivotally attached at its inner end to the base of the shaft, so that said arm can rise or fall in a vertical plane. The sweep arm extends outwardly to the wall of the bin. A plurality of parallel, spaced apart, sationary fins protrude downwardly from the undersurface of the sweep arm. The fins are arranged at a trailing angle of about 45°, relative to the longitudinal axis of the sweep arm. The forward end of each fin is located on a radius which is equal to or larger than the radius on which the rear end of the next outer fin is located. Thus grain moved inwardly by the outer fin is contacted by the inner fin. The fins progressively increase in depth from the outer end of the sweep arm to its inner end, so that each fin is adapted to move about the same volume of grain, even though each fin moves at a different velocity when the arm is sweeping.

In operation, the fins penetrate by gravity into the grain. The free-floating arm is adapted to constantly conform with the surface of the grain body. The fins thus consistently move a constant volume of the grain inwardly, for discharge through the central outlet.

3 Claims, 5 Drawing Sheets

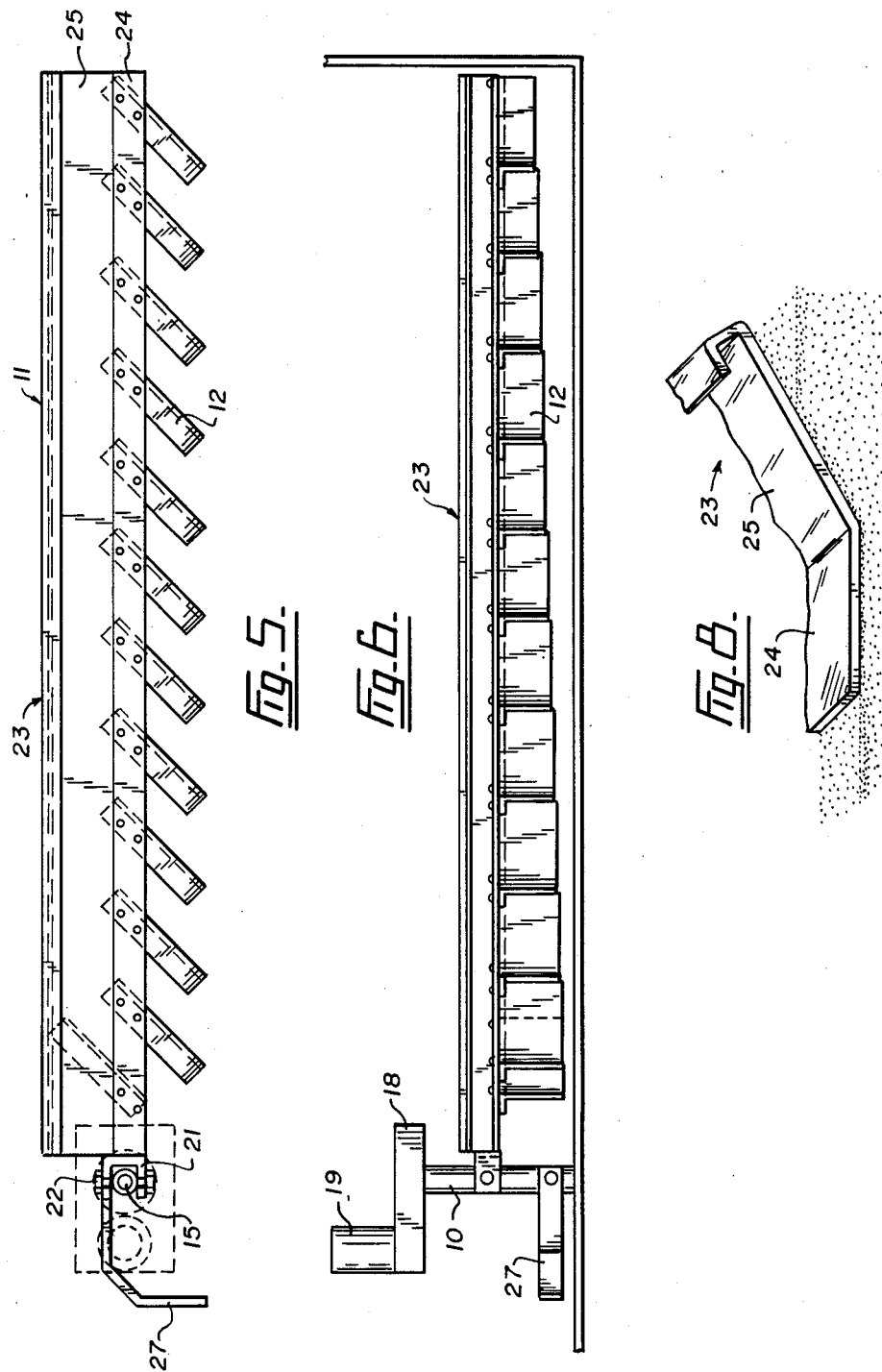

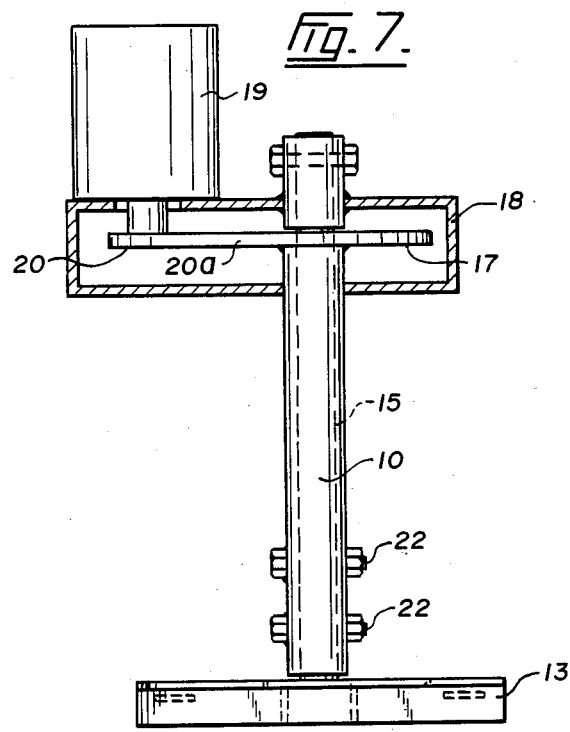
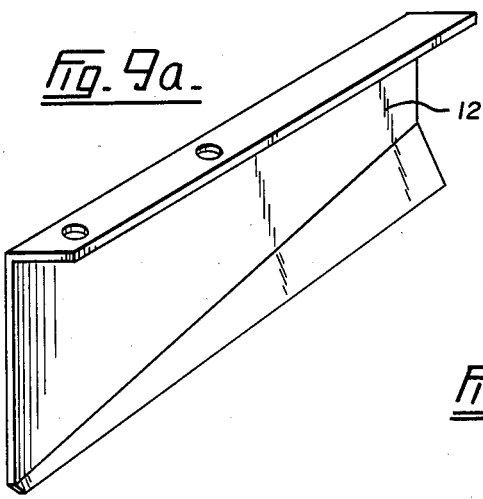
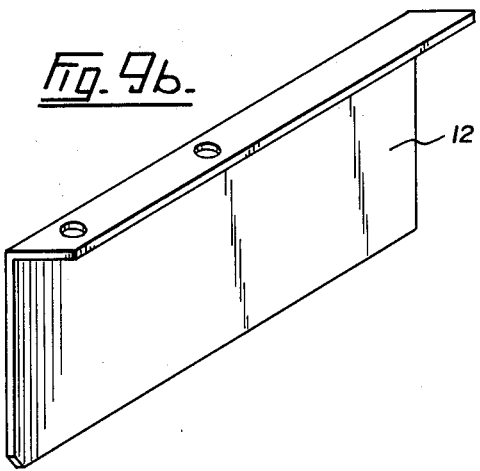

MATERIAL HANDLING DEVICE

BACKGROUND OF THE INVENTION

1. Field of the Invention

This invention relates to a mechanical device for moving grain radially inwardly to a central outlet in the floor of a cylindrical bin.

2. Prior Art

The invention has been developed in conjunction with the emptying of grain bins while not limited to such use, the device will be described in conjunction with such bins and the problems associated with them.

There are many grain bins in use which are provided with a central outlet in the floor of the bin. An auger, positioned beneath the floor of the bin, extends from this central outlet to a discharge point beyond the perimeter of the bin when the grain is to be removed from the bin, the auger is actuated. The grain in the bin feeds by gravity into the auger and is moved to the discharge point, external of the bin, from when it may be recovered by a second auger.

However there is a residual quantity of the grain which takes the form of a right angle triangular ridge extending along the base of the bin side wall. This residue will not flow by gravity alone and remains within the bin.

The common means employed by the farmer to remove this ridge is simply to enter the bin and shovel the remaining grain to the outlet. In the case of a 14' diameter bin, there typically is in the order of 700 bushels of grain remaining in the bin. It is a time-consuming chore to shovel this residual grain to the outlet and it must be carried out in a very dusty atmosphere.

There have been various vacuum and auger devices developed to mechanically remove the residual grain. But these have not won widespread acceptance, primarily because of the cost and complexity of the machinery.

There is thus still a need for simple, durable equipment which will perform this function.

SUMMARY OF THE INVENTION

In accordance with the present invention, a device is provided for moving an annular, triangular-section body of grain to a central outlet in the floor of a cylindrical bin.

The device comprises an upright, rotatable, driven shaft which is positioned over the central outlet.

An elongate sweep arm is pivotally attached at its inner end to the base of the shaft, so that the sweep arm may pivot in a vertical plane. Preferably, the sweep arm is generally flat in the transverse direction and has an upwardly inclined leading edge, so that the arm will ride on top of the grain, rather than diving into it. The arm extends outwardly substantially to the inner surface of the bin side wall.

A plurality of stationary fins extend downwardly from the undersurface of the sweep arm. The fins are substantially equally spaced apart along the length of the arm and are generally parallel in arrangement. The radius of the leading end of each fin, taken from the shaft, is equal to or slightly greater than the radius of the trailing end of the next outer fin, so that grain advanced inwardly by an outer fin will be contacted and moved by the next inwardly positioned fin. The fins are dimensioned progressively deeper in extent from the outer end of the sweep arm to its inner end. The depth of each fin is selected to ensure that each fin will move substantially the same volume of grain, even though the fins are moving at different velocities because of their different distances from the rotating shaft.

In use the 'free-floating' sweep arm will conform to the changing gradient of the body of grain. The weight of the sweep arm and fins causes the latter to penetrate down into the grain. As the arm rotates, the fins function to impel the grain inwardly. The grain moved inwardly by one fin on one rotation is further advanced inwardly by the next fin on the next rotation.

In a preferred feature, a second sweep arm, of generally concave configuration, is attached to the shaft beneath the sweep arm, to follow the latter and scrape along the floor to assist in feeding the grain into the central outlet. As a result of this assistance, the finned arm may be rotated at increased velocity, thereby accelerating the discharge of grain.

Broadly stated, the invention is a device for moving a body of granular material to a central discharge outlet in a generally flatbottomed cylindrical storage bin, said body having a generally triangular section and an inwardly downwardly sloping upper surface, comprising: an upstanding, rotatable drive shaft; means for supporting the drive shaft in an upstanding position over the central outlet; means, associated with the drive shaft, for rotating it about its longitudinal axis; a sweep arm pivotally mounted at its inner end to the base of the drive shaft for rotation thereby and extending outwardly to adjacent the inner upstanding surface of the container side wall, said sweep arm being operative to pivot in a vertical plane about its inner connection, so as to conform to the changing gradient of the body of granular material, said sweep arm having an upwardly inclined leading edge portion which leading edge portion functions to prevent the sweep arm from diving into the granular material; and a plurality of stationary fins mounted on the lower surface of the sweep arm, to extend downwardly therefrom, for penetrating into the granular material and moving it inwardly to the discharge outlet, said fins being spaced apart and substantially parallel one to another, said fins being angularly arranged relative to the radius of the container and increasing in depth inwardly from the outer end of the arm, whereby said fins will each move substantially the same amount of granular material.

DESCRIPTION OF THE DRAWINGS

FIG. 5 is a top plan view of the device;

FIG. 6 is a side view of the device showing the progressive increase in depth of the fins;

FIG. 7 is a sectional side view of the drive member and reduction box arrangement;

FIG. 8 is a perspective view showing the angularly inclined configuration of the leading edge of the sweep arm; and FIGS. 9(a) and 9(b) are perspective views of the fin geometries utilized.

DESCRIPTION OF THE PREFERRED EMBODIMENT

Figure 1:
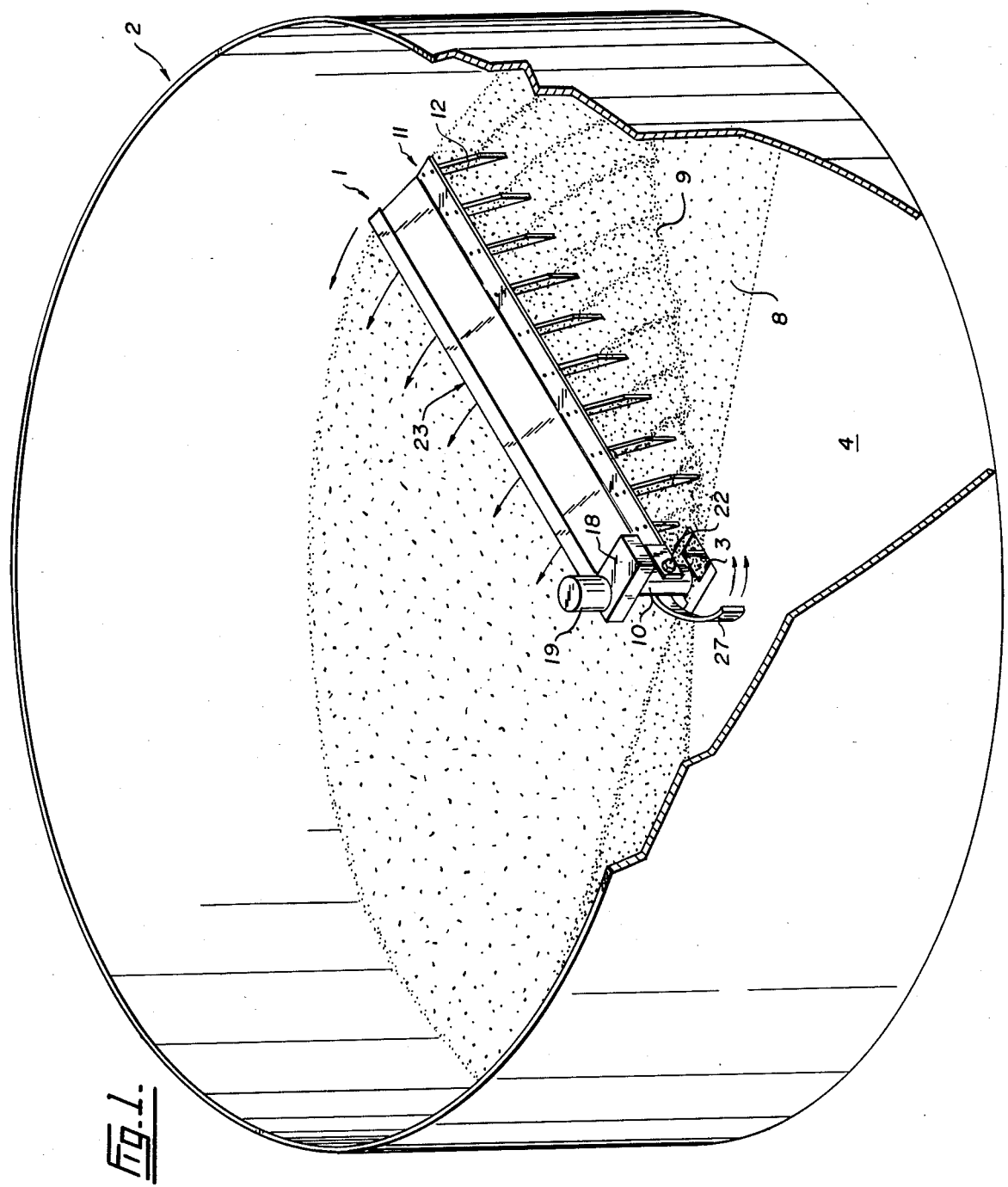
FIG. 1 is a perspective view of the device in operation in a bin, the bin having been cut away, to more clearly illustrate the device.
Figure 2:
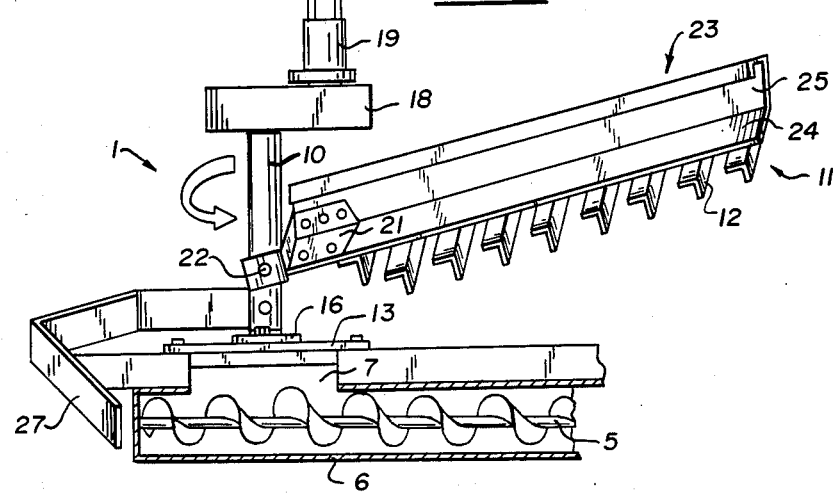
FIG. 2 is a side view of the device, illustrating the pivotal capability of the finned sweep arm.
Figure 3:
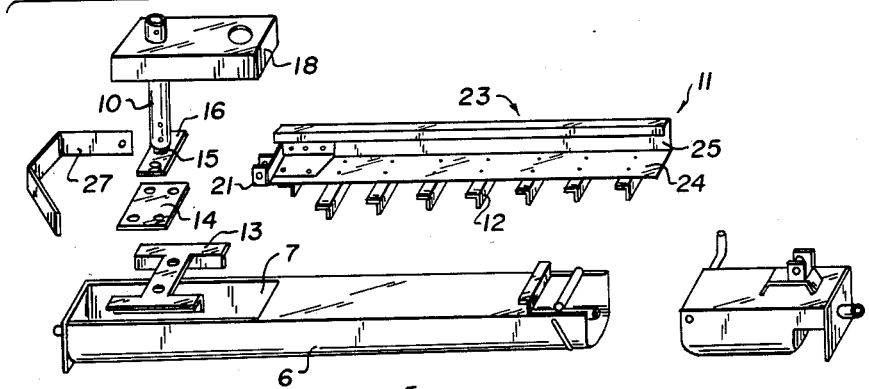
FIG. 3 is an exploded perspective view of the parts, making up the device, looking down from above.
Figure 4:
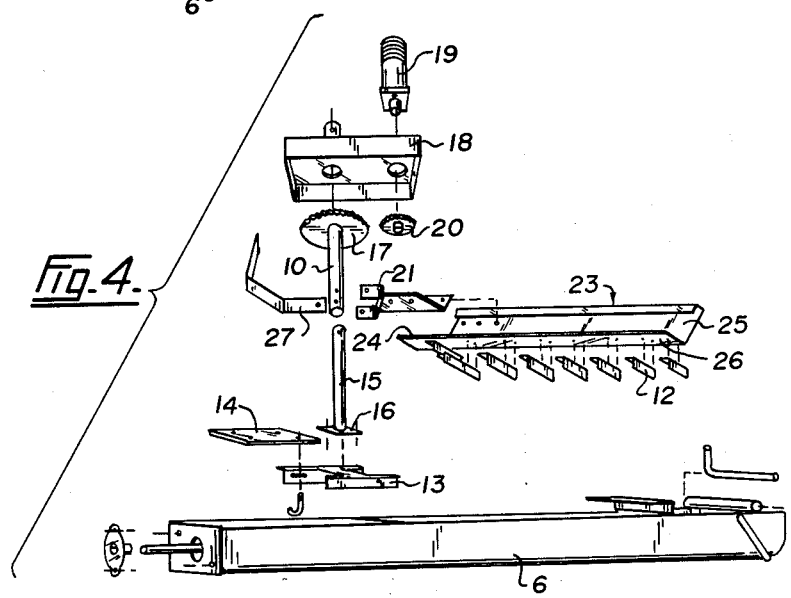
FIG. 4 is an exploded perspective view of the parts, looking up from below.

FIG. 1 shows the device 1 in a cylindrical storage bin 2. This bin 2 is typical of the type used to store grain. As shown, the bin 2 has a central outlet 3 in its floor 4, through which the grain may be discharged. An auger 5 (shown in FIG. 2), having an enclosing tray 6 with an opening 7 which registers with the outlet 3, extends beneath the floor 4 from the central outlet 3, for discharging the grain to a suitable recovery point outside the perimeter of the bin.

The device 1 functions to mechanically move a body 8 of grain, remaining after most of the grain contained in the bin 2 has been discharged by gravity, to the outlet 3. This residual body 8 of grain has a generally right angle triangle cross-section with an upper surface 9 sloping downwardly from the bin wall toward the outlet 3.

The device 1 comprises an upstanding, rotatable shaft 10, positioned over the central outlet 3, and a sweep arm 11 extending radially of the bin 2 and being pivotally connected at its inner end to the base of the shaft 10, for pivoting in a vertical plane. The sweep arm 11 comprises a plurality of angularly arranged fins 12 spaced along its undersurface. These stationary fins 12 penetrate by gravity into the grain and function to move it inwardly when the arm 11 is rotated by the shaft 10. By 'stationary' is meant that the fins 12 are fixed relative to the sweep arm 11; however they of course move with the arm when it is rotated.

More particularly, there is provided means for supporting the tubular shaft 10 over the outlet 3. Such means comprises an H-shaped plate 13, which is mounted on the rim of the auger tray 6. An offset plate 14 is bolted to the H-shaped plate 13, to provide a base. A support shaft 15, having a base flange 16, is bolted to the offset plate 14, so that the support shaft 15 extends upwardly from the auger tray opening 7.

The tubular shaft 10 is adapted to fit snugly over the support shaft 15 and be supported at its lower end by the base flange 16. The tubular shaft 10 is thus arranged to extend upwardly from the central outlet 3 and may be rotated on the base flange 16.

At its upper end, the vertical shaft 10 carries a horizontally extending, driven sprocket 17. The sprocket 17 is welded to the shaft 10 and is solid therewith.

As shown in FIG. 7, a box-like housing 18 is bolted onto the upper end of the support shaft 15 and encloses the sprocket 17 of the rotatable shaft 10. A hydraulic motor 19 is mounted on this housing 18. The drive sprocket 20 of the motor 19 drives the rotatable shaft sprocket 17 by means of an endless chain 20a. The motor 19 and chain 20a thus provide means for rotating the shaft 10 about its longitudinal axis. The motor 19 is conveniently actuated by the hydraulic system of a tractor (not shown).

The sweep arm 11 comprises a bracket 21, which is pivotally attached to the base of the rotatable shaft 10 by the pin 22. At its other end, the bracket 21 is bolted to an elongate, flat impellor member 23. This impellor member 23 is thus able to pivot freely in a vertical plane about the pin 22.

The impellor member 23 comprises a flat main portion 24 and a leading edge portion 25; the latter is bent upwardly at an angle of about 45°, relative to the main portion 24. The upwardly slanted leading edge portion 25 functions to prevent the main portion 24 from diving into the grain; instead it remains riding on top of the grain surface 9.

A plurality of stationary fins 12 extend downwardly from the undersurface 26 of the impellor member main portion 24. These fins 12 are parallel to each other and are spaced at regular intervals along the length of the main portion 24. The fins 12 are disposed at a trailing angle of about 30°, relative to the longitudinal axis of said main portion 24. The leading end of an inner fin 12 is disposed at a radius equal to or greater than the radius of the inner end of the next outer fin 12, so that the grain moved by the outer fin will be contacted and moved inwardly by said next inner fin. As shown in FIG. 6, the extent of depth of each fin 12 is progressively greater along the formation from the outer end of the sweep arm 11 to its inner end. The selected depth of each fin is such that they will move substantially equal volumes of grain, even though they move at different velocities.

In summary, the sweep arm 11 is free-floating in a vertical plane and is moved circularly along the grain surface 9. As the angularity of the surface 9 varies, the sweep arm 11 adjusts accordingly, to maintain its substantially contiguous contact with said surface. The stationary fins 12 penetrate by gravity into the grain and, due to their angular arrangement, impel the grain inwardly in progressive stages on each rotation of the sweep arm 11, toward the central outlet 3.

In a preferred feature, a concave second stage impellor 27 is bolted to the rotatable shaft 0 so as to sweep along the bin floor 4 directly behind the sweep arm 11. This impellor 27 assists in the feeding of the grain into the central outlet 3 and, as a result, the sweep arm 11 can be operated at a greater speed.

The scope of the invention is now defined in the following claims.

The embodiments of the invention in which an exclusive property or privilege is claimed are defined as follows:

1. A device for moving a body of granular material to a central discharge outlet in a generally flat-bottomed cylindrical storage bin, said body having a generally triangular section and an inwardly downwardly sloping upper surface, comprising:

an upstanding, rotatable drive shaft;

means for supporting the drive shaft in an upstanding position over the central outlet;

means, associated with the drive shaft, for rotating it about its longitudinal axis;

a sweep arm pivotally mounted at its inner end to the base of the drive shaft for rotation thereby and extending outwardly to adjacent the inner upstanding surface of the container side wall, said sweep arm being operative to pivot in a vertical plan about its inner connection, so as to conform to the changing gradient of the body of granular material, said sweep arm having an upwardly inclined leading edge portion which leading edge portion functions to prevent the sweep arm from diving into the granular material; and a plurality of stationary fins mounted on the lower surface of the sweep arm, to extend downwardly therefrom, for penetrating into the granular material and moving it inwardly to the discharge outlet, said fins being spaced apart and substantially parallel one to another, said fins being angularly arranged relative to the radius of the container and increasing in depth inwardly from the outer end of the arm, whereby said fins will each move substantially the same amount of granular material.

2. A device as set forth in claim 1 further comprising: a horizontal, concave impellor arm mounted on the drive shaft adjacent the bin floor and arranged to follow the sweep arm, for accelerating the rate of movement of granular material into the discharge outlet.

3. A device as set forth in claim 1 or 2 wherein the sweep arm is attached to the drive shaft so as to extend radially of the bin, and said fins are mounted at an angle of approximately 45°, relative to the longitudinal axis of said arm.

* * * * *